Oct. 29, 1968  E. J. ZAHURANEC  3,407,842
MANIFOLD FITTING
Filed Oct. 21, 1965
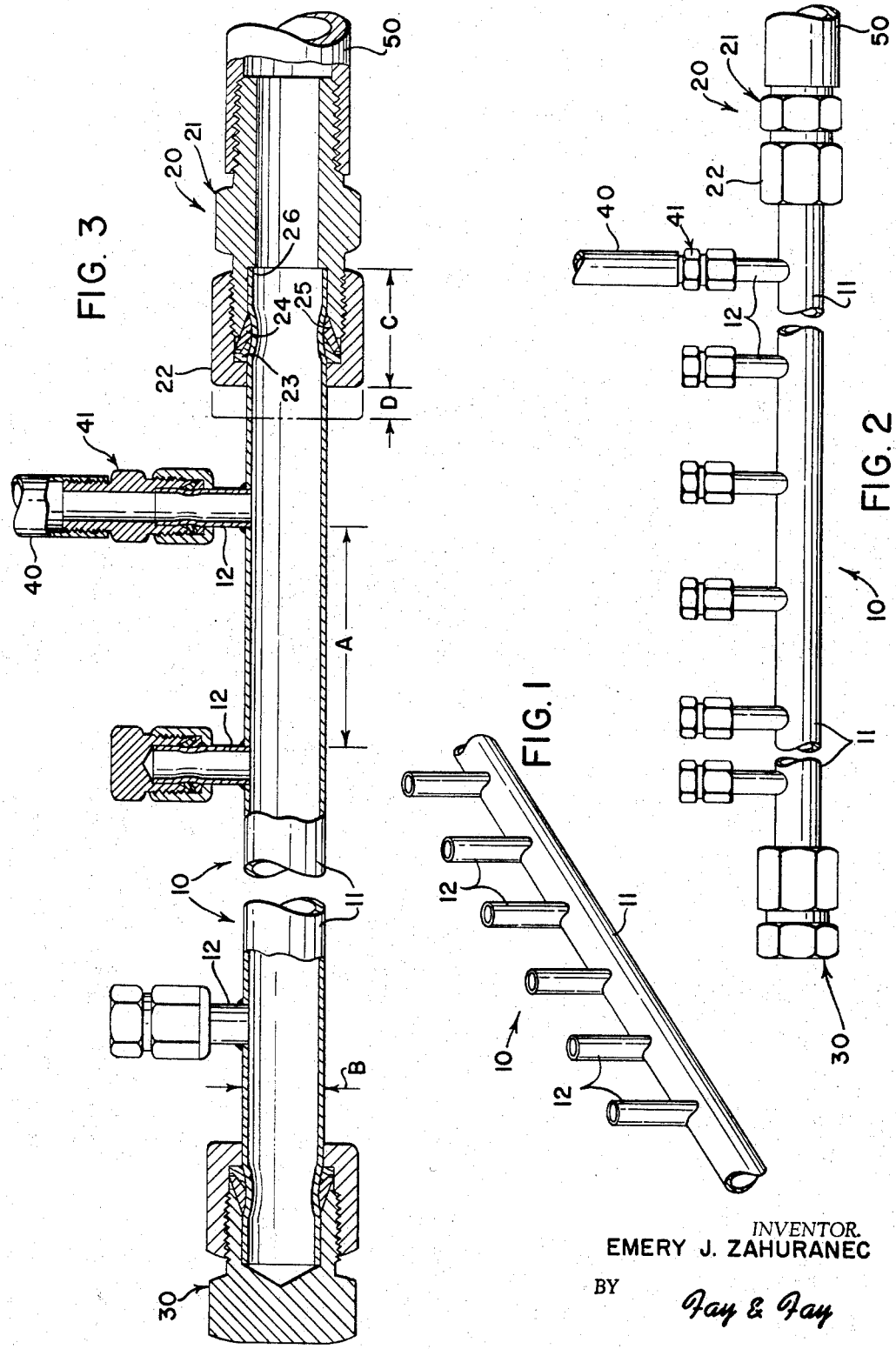
INVENTOR.
EMERY J. ZAHURANEC
BY
*Fay & Fay*
ATTORNEYS

United States Patent Office 3,407,842
Patented Oct. 29, 1968

3,407,842
MANIFOLD FITTING
Emery J. Zahuranec, Solon, Ohio, assignor to Crawford Fitting Company, Solon, Ohio, a corporation of Ohio
Filed Oct. 21, 1965, Ser. No. 500,433
4 Claims. (Cl. 137—561)

Disclosed is a manifold fitting adapted to be connected to a fluid source by means of a source tube fitting in order to supply fluid to a plurality of devices. The manifold fitting comprises an elongated tubular conduit having a predetermined outer diameter and a first end and a second end. A plurality of laterally extending tubular branch conduits are secured to the tubular conduit in fluid communication with the interior of the tubular conduit thereby providing a multiplicity of fluid outlets. Each of the branch conduits has a predetermined outer diameter and is adapted to have a branch tube fitting attached thereto. The elongated tubular conduit is adapted to have a source tube fitting attached to at least one of the ends thereof. The distance A between each end of the tubular conduit and a respective adjacent branch conduit is equal to or greater than the depth of insertion of the end of the elongated tubular conduit into the source fitting plus the amount of elongational adjustment of the fitting required to secure the fitting to the elongated tubular conduit. In one embodiment of the invention, the distance between adjacent branch conduits of the tubular conduit is equal to the distance A. In another embodiment of the invention, the distance between adjacent branch conduits is equal to a distance 2A.

This invention relates to fittings and more particularly to a manifold fitting adapted for use with tube couplings.

It frequently occurs in instrumentation setups that a plurality of devices utilized a liquid or gaseous fluid from a common source. In such circumstances, the usual procedure has been to compose a complicated combination of various T's, unions, and valves in order to feed either selectively or simultaneously the various instruments from the common source. It is obvious that the possibility of leakage through the multiplicity of joints between the various fittings in a problem with which to be contended. In addition, the expense of the fittings themselves and the time required to build up such a combination is considerable.

It is and object of this invention to provide a manifold fitting adapted to supply a plurality of devices with fluid from a common source.

It is another object of this invention to provide a manifold fitting wherein the size of the fitting may be varied to accommodate any number of instruments.

Still another object of the invention is to provide a manifold fitting having a plurality of laterally extending branches with the spacing between the branches being such that severance of the manifold adjacent one branch leaves exposed adequate tubular material to connect the manifold to another tube fitting.

A more specific object of the invention is the provision of a header in the form of an elongated tubular member having a plurality of equally spaced branches extending laterally therefrom, the length of the header being of indeterminate length with the spacing between the lateral branches being such that when the header is cut adjacent one branch, there remains sufficient tube stock to permit the securement of a tube fitting to the header.

Other objects and features will become more apparent upon a complete reading of the specification which sets forth in detail but one approved means of carrying out the invention. Such disclosed means are not meant to be limiting inasmuch as it constitutes but one of the various ways in which the principles of the invention may be applied.

In the drawings wherein like reference numerals indicate like parts in the various views:

FIG. 1 is a perspective view of a typical manifold fitting incorporating the principles of the invention;

FIG. 2 is a side elevation view of the manifold fittting of FIG. 1 with various types of tube fittings secured thereto;

FIG. 3 is a view similar to FIG. 2 in section showing the securement of the tube fittings to the manifold fitting.

Turning to FIG. 1, there is illustrated a manifold fittting indicated generally by the reference numeral 10 which incorporates the principles of the instant invention. This fitting comprises an elongated tubular header 11 which may be of indeterminate length. Formed at spaced intervals along the length of the header 11 are apertures into which projects laterally directed tubular branches 12. These branches are secured by welding, brazing, soldering or other appropriate means to the header 11 and provide a multiplicity of flow paths for any fluid passing through the header 11. Each of the lateral branches 12 is of sufficient length to have secured thereto to tube fitting such as is illustrated in FIG. 3. By this means, the header may be connected to various types of instruments and devices.

It is believed to be understood that the header 11 may be of indeterminate length, with a multiplicity of branches 12 extending therefrom, thus providing a device which may be severed at any desired length depending upon the particular adaptation of the instrumentation setup. Alternatively, the headers could be fabricated in predetermined lengths and joined together end-to-end to complete the desired length of fittting. Moreover, the lateral branches 12 may be circumferentially spaced about the header 11 to provide a diverse orientation of the fluid outlets.

Whether severing a length of header of indeterminate length or producing headers of a predetermined length, two dimensions must be maintained in a predetermined relationship. The first is the spacing A between the adjacent branches 12 and the second is outer diameter B of the header 11.

The importance of this relationship is best demonstrated in connection with FIG. 3 wherein a typical tube fitting 20 is shown secured on one end of the header 11. The fitting 20 comprises a body 21 over one end of which is threadably received a cap 22. A pair of ferrules 23, 24 are adapted to be received over the end of the tube. Through the coaction of the cap 22, the flared mouth 25 on the body 21 and the ferrules, the fitting is secured to the header. Ordinarily, the tubing projects inwardly of the fitting to a position where it is abutting a shoulder 26 formed internally of the fitting. This assures that adequate tube stock is available for the gripping action of the ferrules.

The usual practice in producing tube fittings is to vary the depth of insertion of the tubing into the fitting as a function of the dimension of the tubing. Thus, as the outer dimension B of the tubing increases, so also the depth of insertion C of the tubing in the fitting increases. An additional dimension which must be taken into account is the dimension D which, as shown in dotted lines in FIG. 3, represents the longtudinal distance which the cap 22 is advanced in securing the fitting to the end of the tubing. As will be understood, the dimension D is a function of the thread pitch on the body 21 of the fitting 20 as well as the configuration of the ferrules and the mouth 25. Thus, it is apparent that the dimensions C and D vary with the type of fitting and outer diameter of the tubing. However, in general, the length of tube stock which must be made available for securement of the tube fitting may be expressed as C plus D. In terms of the manifold fitting 10, the spacing A between the branches may be expressed as A being equal to or greater than $C+D$. A manifold fitting fabricated according to this dimensional relationship will then be such that, in the even a particular length of header is desired, it is only necessary to sever the header adjacent one of the lateral branches and, assuming the above-described relationship has been observed, there remain adequate tube stock for securing a fitting thereto.

As a practical matter, a further factor which must be considered is the potential interference between the fitting 20 and the fittings which are attached to the lateral branches 12. The possibility of interference between the fittings may be removed by lengthening the branches 12 or increasing the spacing A between the branches. Precisely which dimension is increased depends to a great extent on the projected use of the manifold fitting. If fittings such as valves which require manual manipulation are to be employed on the branches 12, it is advantageous that the spacing A be increased to facilitate the manipulation of the valves. On the other hand, if the length of the header is determinative, it may be desirable to increase the length of the branches.

A typical usage of the manifold fittting comprising the instant invention would be as follows: Assuming a plurality of devices are to utilize a liquid or gaseous fluid from a common source, a header, either of a predetermined length or one that was cut to the required length, would be utilized. If a header or predetermined length was not available, a header of indeterminate length would be severed adjacent one of the lateral branches thereby leaving exposed a length A of tube stock at either end of the header. A plug 30 would be secured to one end of the header thereby blocking any flow of fluid from that end of the header. Similar plugs would be placed on the lateral branches if not all of the branches are to be used immediately. It is to be understood that other fittings such as quick connect couplings or valves must also be attached to the branches 12 as well. Those conduits 40 which are to be used to transmit the gas or liquid to the instruments would be coupled by fittings 41 to the lateral branches 12. Similarly, the fitting 20 would be secured to the exposed end of the header as shown in FIG. 3 with a conduit 50 being attached to the fitting. Conduit 50 would also be connected to the source of the liquid or gas. In this circumstance, it is readily apparent that the fluid passing into the header 11 is channeled through the lateral branches to the devices utilizing such a fluid thereby providing a simple, substantially leak-proof header which can be fabricated with ease and does not require the stocking of any specific types of fittings or special parts.

An alternative construction of the manifold fitting which is contemplated by the principles of this invention consists of doubling the spacing between the lateral branches so that the dimensional relationship above described may be expressed as A being equal to or greater than $2\ (C+D)$. The advantage of this relationship is that the manifold may be produced in indeterminate lengths and severed at any point along the length of the manifold intermediate two of the branches thereby leaving exposed adequate tube stock on both severed ends of the header on which to secure any desired fitting.

Various modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment nor the terminology employed in describing it is to be limiting, but rather, it is my desire to be restricted only by the scope of the appended claims.

What is claimed is:

1. A manifold fitting adapted to be connected to a fluid source by means of a source tube fitting in order to supply fluid to a plurality of devices comprising:
   an elongated tubular conduit having a predetermined outer diameter, a first end and a second end;
   a plurality of laterally extending tubular branch conduits secured to said tubular conduit, with each of said branch conduits being in fluid communication with the interior of said elongated tubular conduit thereby providing a multiplicity of fluid outlets;
   each of said branch conduits having a predetermined outer diameter and being adapted to have a branch tube fitting attached thereto;
   said elongated tubular conduit being adapted to have a source tube fitting attached to at least one of said ends thereof;
   the distance A between each end and a respective adjacent branch conduit and a distance A between adjacent branch conduits being equal and governed by the relationship of A being substantially equal to or greater than $C+D$ wherein C is the depth of insertion of said one end of the elongated tubular conduit into the source fitting, and D is the amount of longitudinal adjustment of the fitting required to secure the fitting to the elongated tubular conduit whereby severance of the conduit at any point along its length between said branch conduits and adjacent one of said branch conduits leaves exposed and adequate length A of said tubular conduit on which to attach a source tube fitting.

2. The manifold fitting of claim 1 wherein A is equal to $C+D$.

3. A manifold fitting adapted to be connected to a fluid source by means of a source tube fitting in order to supply fluid to a plurality of devices comprising:
   an elongated tubular conduit having a predetermined outer diameter, a first end and a second end;
   a plurality of laterally extending tubular branch conduits secured to said tubular conduit, with each of said branch conduits being in fluid communication with the interior of said elongated tubular conduit thereby providing a multiplicity of fluid outlets;
   each of said branch conduits having a predetermined outer diameter and being adapted to have a branch tube fitting attached thereto;
   said elongated tubular conduit being adapted to have a source tube fitting attached to at least one of said ends thereof;
   the distance between each end of said tubular conduit and a respective adjacent branch conduit having a value A;
   the distance between adjacent branch conduits having a value 2A;
   the value A being substantially equal to or greater than $C+D$ wherein C is the depth of insertion of said one end of the elongated tubular conduit into the source fitting, and D is the amount of longitudinal adjustment of the fittting required to secure the fitting to the elongated tubular conduit;
   whereby severance of the tubular conduit at any point along its length at the midpoint between adjacent branch conduits leaves exposed an adequate length A of said tubular conduit on which to attach a source tube fitting.

4. The fitting of claim 3 wherein A is equalt to $C+D$.

References Cited

UNITED STATES PATENTS

| | | | |
|---|---|---|---|
| 1,039,013 | 9/1912 | Berryman | 137—561 |
| 2,532,918 | 12/1950 | Hungerford | 137—561 |
| 2,811,982 | 11/1957 | De Young | 137—561 |
| 2,952,996 | 9/1960 | MacLeod | 137—561 XR |
| 3,175,578 | 3/1965 | Patterson et al. | 137—561 |
| 3,181,484 | 5/1965 | Keppler | 137—561 XR |
| 2,287,633 | 6/1942 | Newcum | 137—608 XR |

HENRY T. KLINKSIEK, *Primary Examiner.*